(12) United States Patent
Stern et al.

(10) Patent No.: US 12,504,668 B2
(45) Date of Patent: Dec. 23, 2025

(54) FULLY INTEGRATED CHIP PLATFORM FOR ELECTRICALLY PUMPED FREQUENCY COMB GENERATION

(71) Applicant: The Trustees of Columbia University in the City of New York, New York, NY (US)

(72) Inventors: Brian Stern, New York, NY (US); Michal Lipson, New York, NY (US); Xingchen Ji, New York, NY (US); Alexander L Gaeta, New York, NY (US); Yoshitomo Okawachi, River Edge, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1074 days.

(21) Appl. No.: 17/036,166

(22) Filed: Sep. 29, 2020

(65) Prior Publication Data

US 2021/0026223 A1 Jan. 28, 2021

Related U.S. Application Data

(63) Continuation of application No. PCT/US2019/024937, filed on Mar. 29, 2019.
(Continued)

(51) Int. Cl.
*G02F 1/39* (2006.01)
*G02F 1/35* (2006.01)
(Continued)

(52) U.S. Cl.
CPC ............. *G02F 1/39* (2013.01); *G02F 1/3536* (2013.01); *H01S 5/0092* (2013.01); *H01S 5/0615* (2013.01); *H01S 5/5054* (2013.01); *G02F 1/392* (2021.01); *G02F 2203/17* (2013.01); *G02F 2203/56* (2013.01); *H01S 2301/085* (2013.01)

(58) Field of Classification Search
None
See application file for complete search history.

(56) References Cited

U.S. PATENT DOCUMENTS 7,260,279 B2   8/2007   Gunn et al.
8,831,056 B2   9/2014   Savchenkov et al.
(Continued)

FOREIGN PATENT DOCUMENTS

WO   2018/001442 A1   1/2018

OTHER PUBLICATIONS

Bao et al., "Nonlinear conversion efficiency in Kerr frequency comb generation," Opt. Lett., vol. 39, (2014), pp. 6126-6129.
(Continued)

*Primary Examiner* — Eric L Bolda
(74) *Attorney, Agent, or Firm* — BakerHostetler

(57) ABSTRACT

Example methods, devices, and systems for optical emission are disclosed. An example device can comprise one or more optical filters. The one or more optical filters can be configured to be coupled to an optical amplifier. The device can comprise a microresonator configured to receive an output of the one or more optical filters and output, based on parametric multiwave mixing, a frequency comb. The one or more optical filters and the microresonator can be integrated into a single chip.

8 Claims, 7 Drawing Sheets

Related U.S. Application Data

(60) Provisional application No. 62/650,086, filed on Mar. 29, 2018.

(51) Int. Cl.
  *H01S 5/00* (2006.01)
  *H01S 5/06* (2006.01)
  *H01S 5/50* (2006.01)

(56) References Cited

U.S. PATENT DOCUMENTS

| | | | |
|---|---|---|---|
| 9,042,003 B2 | 5/2015 | Li et al. | |
| 9,348,194 B2 | 5/2016 | Herr et al. | |
| 9,490,605 B2 | 11/2016 | Gaeta et al. | |
| 9,891,500 B1* | 2/2018 | Chu | H01S 3/067 |
| 2004/0213507 A1 | 10/2004 | Liu | |
| 2008/0285606 A1* | 11/2008 | Kippenberg | G02F 1/39 372/32 |
| 2012/0294319 A1* | 11/2012 | Maleki | G02F 1/39 372/18 |
| 2016/0134078 A1 | 5/2016 | Gaeta et al. | |
| 2018/0006424 A1 | 1/2018 | Vahala et al. | |
| 2018/0143461 A1* | 5/2018 | Zheng | H01S 5/125 |

OTHER PUBLICATIONS

Brasch et al., "Photonic chip-based optical frequency comb using soliton Cherenkov radiation," Science, vol. 351, (2016), pp. 357-360.
Campenhout et al., "Electrically pumped InP-based microdisk lasers integrated with a nanophotonic silicon-on-insulator waveguide circuit," Opt. Express, vol. 15, (2007), pp. 6744-6749.
Coen et al., "Modeling of octave-spanning Kerr frequency combs using a generalized mean-field Lugiato Lefever model," Opt. Lett., vol. 38, (2013), pp. 37-39.
Cong et al., "Power-efficient Gray-scale Control of Silicon Thermo-optic Phase Shifters by Pulse Width Modulation Using Monolithically Integrated MOSFET," in Optical Fiber Communication Conference (2015), paper M2B.7 M2B.7 (Optical Society of America, 2015).
Del'Haye et al., "Octave spanning tunable frequency comb from a microresonator," Physical Review Letters, vol. 107, Issue 6, No. 063901, Aug. 1, 2011.
Del'Haye et al., "Optical frequency comb generation from a monolithic microresonator," Nature, vol. 450, (2007), pp. 1214-1217.
Dutt et al., "On-chip dual comb source for spectroscopy," ArXiv161107673, Phys., (2016).
Fan et al., "290 Hz Intrinsic Linewidth from an Integrated Optical Chip-based Widely Tunable InP—Si3N4 Hybrid Laser," in Conference on Lasers and Electro-Optics (2017), paper JTh5C.9 JTh5C.9 (Optical Society of America, 2017).
Fang et al., "Electrically pumped hybrid AlGaInAs-silicon evanescent laser," Opt. Express, vol. 14, (2006), pp. 9203-9210.
Ferdous et al., "Spectral line-by-line pulse shaping of on-chip microresonator frequency combs," Nat. Photonics, vol. 5, (2011), pp. 770-776.
Griffith et al., "Silicon-chip mid-infrared frequency comb generation," Nat. Commun., vol. 6, (2015), 6299.
Hausmann et al., "Diamond nonlinear photonics," Nat. Photonics, vol. 8, (2014), pp. 369-374.
Herr et al., "Temporal solitons in optical microresonators," Nat. Photonics, vol. 8, (2014), pp. 145-152.
Ji et al., et al., "Ultra-low-loss on-chip resonators with sub-milliwatt parametric oscillation threshold," Optica., vol. 4, (2017), pp. 619-624.
Johnson et al., "Microresonator-based comb generation without an external laser source," Opt. Express, vol. 22, (2014), pp. 1394-1401.
Joshi et al., "Thermally controlled comb generation and soliton modelocking in microresonators," Optics Letters, vol. 41, Issue 11, (Mar. 16, 2017), pp. 2565-2568.

Jung et al., "Optical frequency comb generation from aluminum nitride microring resonator," Opt. Lett., vol. 38, (2013), pp. 2810-2813.
Kobayashi et al., "Silicon Photonic Hybrid Ring-Filter External Cavity Wavelength Tunable Lasers," J. Light. Technol., vol. 33, (2015), pp. 1241-1246.
Kuyken et al., "An octave-spanning mid-infrared frequency comb generated in a silicon nanophotonic wire waveguide," Nat. Commun., vol. 6, (2015).
Lamont et al., "Route to stabilized ultrabroadband microresonator-based frequency combs," Opt. Lett., vol. 38, (2013), pp. 3478-3481.
Lee et al., "Demonstration of 122% wall plug efficiency in uncooled single mode external-cavity tunable Si/III-V hybrid laser," Opt. Express, vol. 23, (2015), 12079.
Levy et al., "CMOS-compatible multiple-wavelength oscillator for on-chip optical interconnects," Nat. Photonics, vol. 4, (2010), pp. 37-40.
Li et al., "Electro-optical frequency division and stable microwave synthesis," Science, (2014), 1252909.
Liang et al., "High spectral purity Kerr frequency comb radio frequency photonic oscillator," Nature Communications, vol. 6, (Aug. 11, 2015), 7957.
Liang et al., "Whispering-gallery-mode-resonator-based ultranarrow linewidth external-cavity semiconductor laser," Opt. Lett., vol. 35, (2010), pp. 2822-2824.
Marin-Palomo et al., "Microresonator-based solitons for massively parallel coherent optical communications," Nature, vol. 546, (2017), pp. 274-279.
Matsko et al., "Mode-locked Kerr frequency combs," Opt. Lett., vol. 36, (2011), pp. 2845-2847.
Newbury, Searching for applications with a fine-tooth comb, Nature Photonics, vol. 5, (2011), pp. 186-188.
Okawachi et al., "Octave-spanning frequency comb generation in a silicon nitride chip," Opt. Lett., vol. 36, (2011), pp. 3398-3400.
Oldenbeuving et al., "25 kHz narrow spectral bandwidth of a wavelength tunable diode laser with a short waveguide-based external cavity," Laser Phys. Lett., vol. 10, (2013), 015804.
Papp et al., "Microresonator frequency comb optical clock," Optica., vol. 1, (2014), pp. 10-14.
Pasquazi et al., "Micro-combs: A novel generation of optical sources", Phys. Rep., vol. 729, (2018), pp. 1-81.
Pasquazi et al., "Self-locked optical parametric oscillation in a CMOS compatible microring resonator: a route to robust optical frequency comb generation on a chip," Opt. Express, vol. 21, (2013), pp. 13333-13341.
Peccianti et al., "Demonstration of a stable ultrafast laser based on a nonlinear microcavity," Nat. Commun., vol. 3, (2012), 765.
Razzari et al., "CMOS-compatible integrated optical hyper-parametric oscillator," Nat. Photonics, vol. 4, (2010), pp. 41-45.
Reimer et al., "Integrated frequency comb source of heralded single photons," Opt. Express, vol. 22, (2014), pp. 6535-6546.
Saha et al., "Modelocking and femtosecond pulse generation in chip-based frequency combs," Opt. Express, vol. 21, (2013), pp. 1335-1343.
Savchenkov et al., "Low Threshold Optical Oscillations in a Whispering Gallery Mode CaF2 Resonator," Phys. Rev. Lett., vol. 93, (2004), 243905.
Savchenkov et al., "Tunable Optical Frequency Comb with a Crystalline Whispering Gallery Mode Resonator," Phys. Rev. Lett., vol. 101, (2008), 093902.
Spencer et al., An optical-frequency synthesizer using integrated photonics, Nature, vol. 557, (2018), pp. 81-85.
Stern et al., "Compact narrow-linewidth integrated laser based on a low-loss silicon nitride ring resonator," Opt. Lett., vol. 42, (2017), pp. 4541-4544.
Suh et al., "Microresonator soliton dual-comb spectroscopy," Science, vol. 354, (2016), pp. 600-603.
Suh et al., "Soliton Microcomb Range Measurement," ArXiv170506697, Phys., (2017).
Trocha et al., "Ultrafast optical ranging using microresonator soliton frequency combs," Science, vol. 359, (2018), pp. 887-891.
Villares et al., "Dual-comb spectroscopy based on quantum-cascade-laser frequency combs," Nat. Commun., vol. 5, (2014), 5192.

(56) References Cited

OTHER PUBLICATIONS

Volet et al., "Micro-resonator soliton generated directly with a diode laser," arXiv.org No. 1711.06307, Nov. 16, 2017.
Wang et al., "Frequency comb generation in the green using silicon nitride microresonators," Laser Photonics Rev., vol. 10, (2016), pp. 631-638.
Webb et al., "Experimental observation of coherent cavity soliton frequency combs in silica microspheres," Opt. Lett., 41, (2016), pp. 4613-4616.
Xue et al., "Mode-locked dark pulse Kerr combs in normal-dispersion microresonators," Nat. Photonics, vol. 9, (2015), pp. 594-600.
Yan et al., "Increasing the spectral bandwidth of optical frequency comb generation in a microring resonator using dispersion tailoring slotted waveguide," IEEE Photonics Conference, (Sep. 2013), pp. 230-231.
Yi et al., "Active capture and stabilization of temporal solitons in microresonators," Opt. Lett., vol. 41, (2016), pp. 2037-2040.
Yi et al., "Soliton frequency comb at microwave rates in a high-Q silica microresonator," Optica., vol. 2, (2015), pp. 1078-1085.
Yu et al., "Silicon-chip-based mid-infrared dual-comb spectroscopy," Nat. Commun., vol. 9, (2018), 1869.

\* cited by examiner

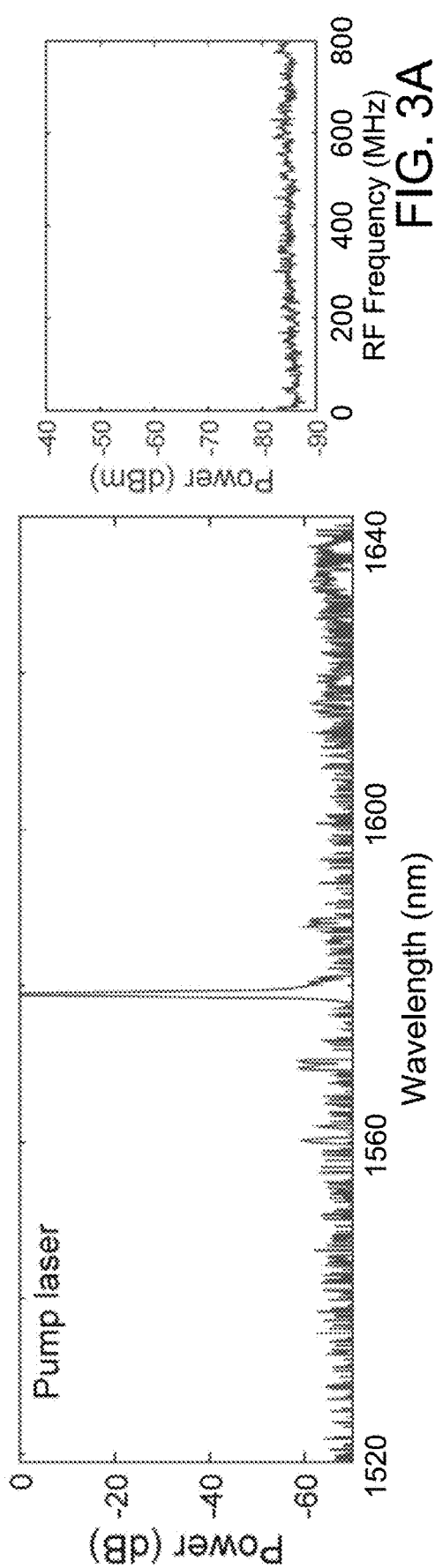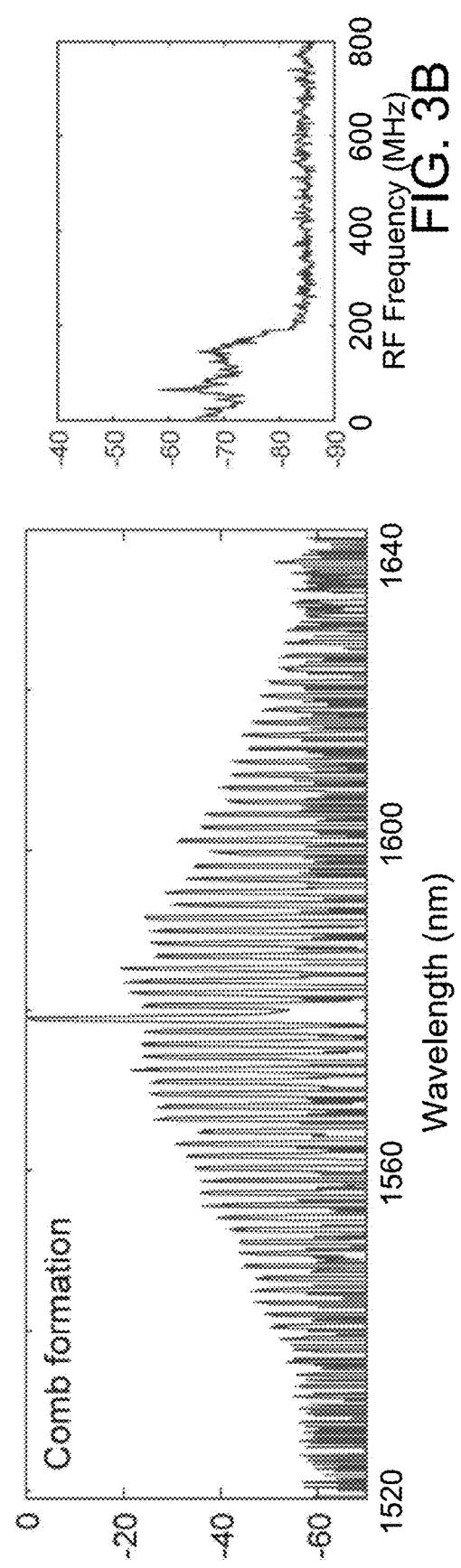
FIG. 3A
FIG. 3B

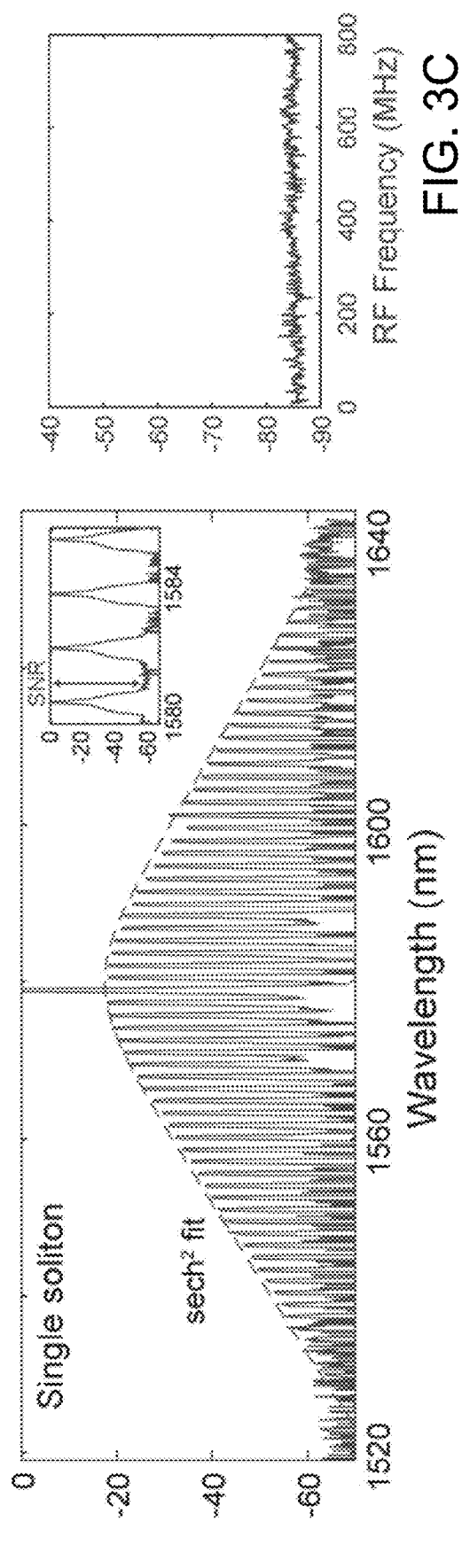
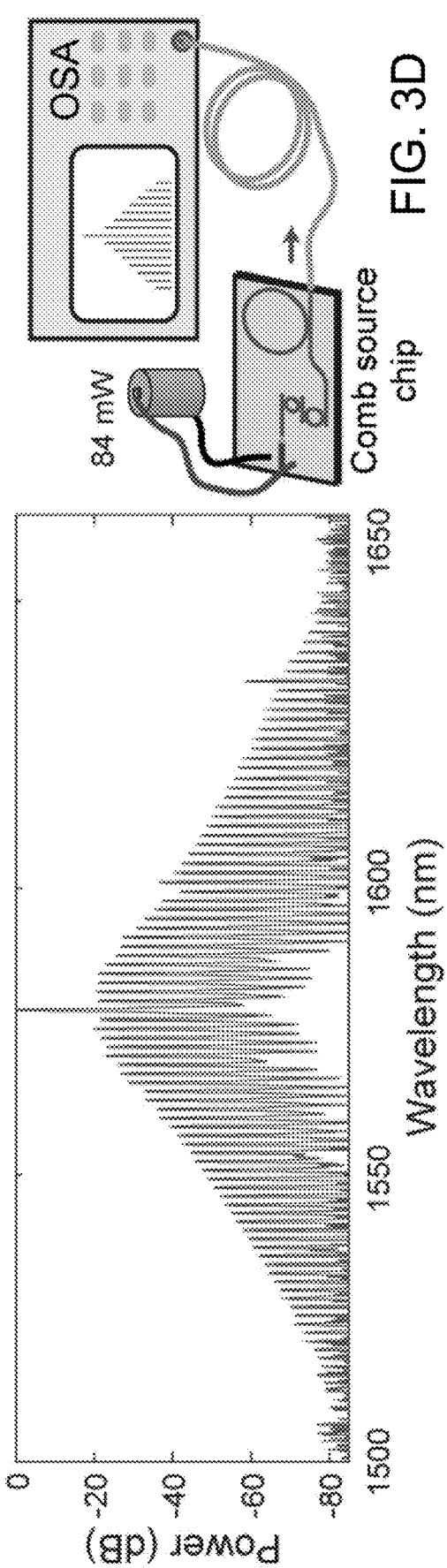
FIG. 3C
FIG. 3D

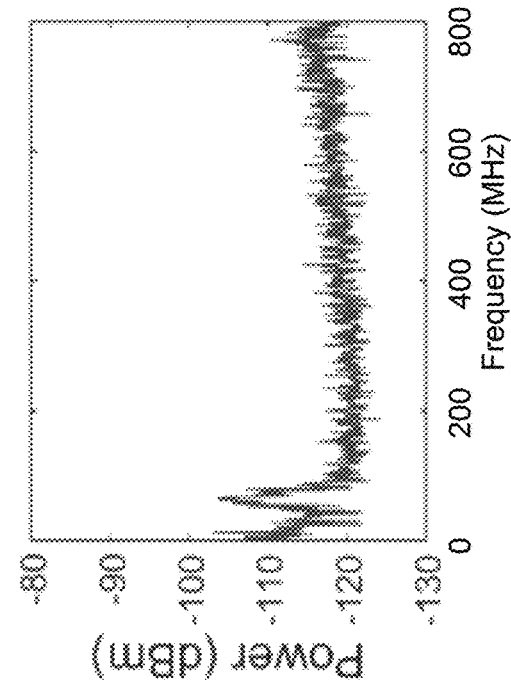
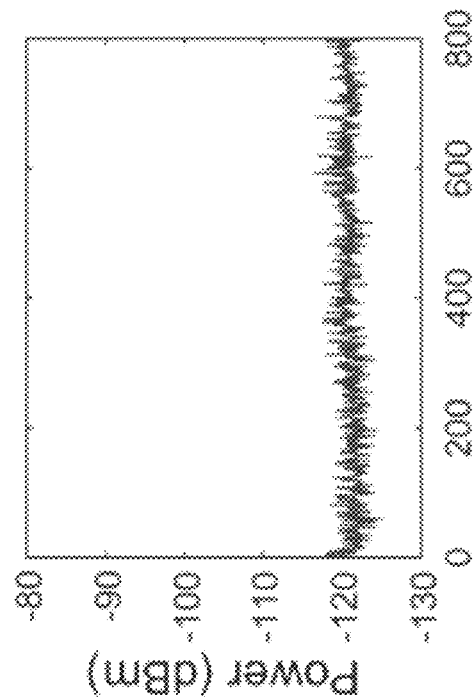
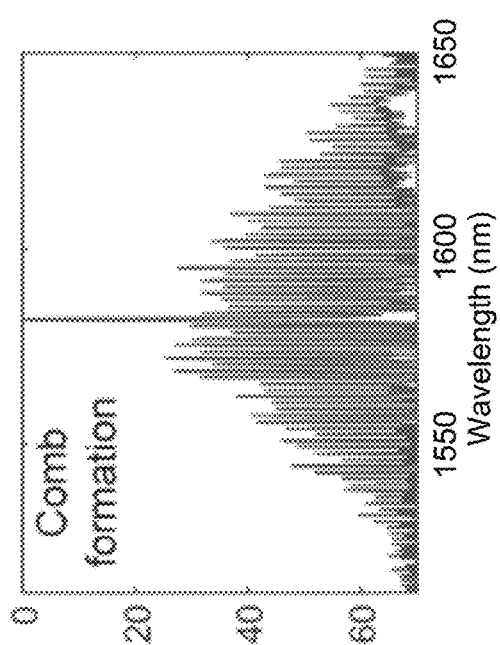
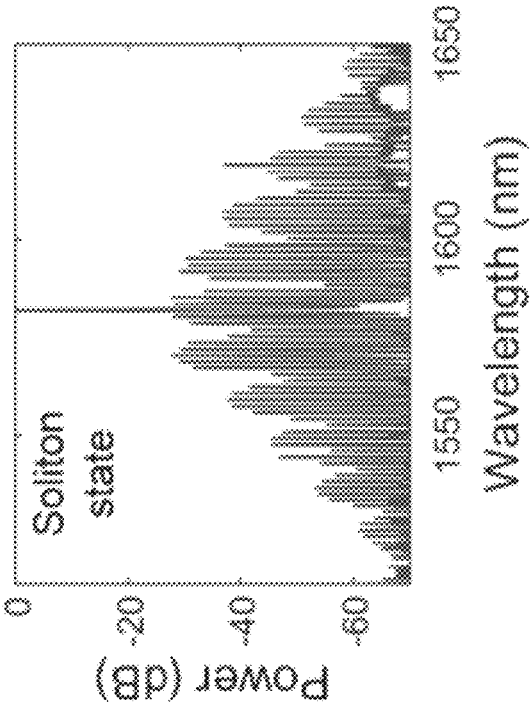
FIG. 4C
FIG. 4D

FULLY INTEGRATED CHIP PLATFORM FOR ELECTRICALLY PUMPED FREQUENCY COMB GENERATION

CROSS-REFERENCE TO RELATED APPLICATION

This application is a continuation of International Application PCT/US2019/024937, filed Mar. 29, 2019, which claims the benefit of U.S. Provisional Patent Application No. 62/650,086, filed Mar. 29, 2018, each of which is hereby incorporated by reference in its entirety for any and all purposes.

GOVERNMENT RIGHTS

This invention was made with government support under Contract No. HR0011-16-C-0107 awarded by the Defense Advanced Research Projects Agency. The government has certain rights in the invention.

BACKGROUND

Frequency combs based on chip-scale microresonators offer the potential for high-precision photonic devices for time and frequency applications in a highly compact and robust platform. By pumping the microresonator with a single-frequency pump laser, additional discrete, equidistant frequencies are generated through parametric four-wave mixing, resulting in a Kerr frequency comb[9,10]. Under suitable conditions temporal cavity solitons can be excited, which results in stable, low-noise combs with ultraprecise spacing[11-14]. Many applications are based on such tight frequency and timing stability, including spectroscopy[1-3], low-noise microwave generation4, atomic clocks[5], lidar[6], and telecommunications[7,8]. Extensive research has explored different microresonator platforms to generate frequency combs for these applications[15-24].

While one of the most compelling advantages for the microresonator combs is the potential for the pump source and the microresonator to be fully integrated, previous demonstrations using integrated resonators have relied on external pump lasers that are typically large, expensive, and power hungry, preventing applications where size, portability and low power consumption are critical. Power-efficient integrated lasers have been developed using silicon laser cavities with bonded or attached III-V gain sections[25-28], but losses in these silicon waveguides make comb generation impractical at low power.

These teachings in the art have shortcomings in function, cost, and/or other aspects. Thus, there is a need for improved microresonator combs.

SUMMARY

Example methods, devices, and systems for optical emission are disclosed. An example device can comprise an optical amplifier. The optical amplifier can comprise one or more of a reflective end (e.g., or reflective portion) and a transmissive end. The device can comprise a laser cavity (e.g., or other medium). The laser cavity can be adjacent the optical amplifier. The laser cavity can be configured to receive an output from the optical amplifier. The laser cavity can comprise one or more microrings (e.g., or other filter, such as a grating) configured as tunable optical filters. The laser cavity can comprise a microresonator configured to receive an output of the one or more microrings and output, based on parametric multiwave mixing, a frequency comb.

An example device can comprise one or more optical filters. The one or more optical filters can be configured to be coupled to an optical amplifier. The device can comprise a microresonator configured to receive an output of the one or more optical filters and output, based on parametric multiwave mixing, a frequency comb. The one or more optical filters and the microresonator can be integrated into a single chip.

An example device can comprise a first portion comprising an optical amplifier (e.g., gain medium) and a transmissive end. The device can comprise a second portion adjacent the transmissive end of the first portion and configured to receive an output from the optical amplifier. The second portion can comprise one or more tunable optical filters. The second portion can comprise a microresonator configured to receive an output of the one or more microrings and output, based on parametric multiwave mixing, a frequency comb.

An example device can comprise one or more optical filters. The one or more optical filters can be configured to be coupled to an optical amplifier. The device can comprise a microresonator configured to receive an output of the one or more optical filters and output, based on parametric multiwave mixing, a frequency comb. The one or more optical filters and the microresonator can be integrated into (e.g., comprised by) a single chip.

An example device can comprise a laser and a microresonator configured to receive an output of the laser and generate a frequency comb. A coupling between the microresonator and the laser can be lithographically defined.

Additional advantages will be set forth in part in the description which follows or can be learned by practice. It is to be understood that both the foregoing general description and the following detailed description are exemplary and explanatory only and are not restrictive.

BRIEF DESCRIPTION OF THE DRAWINGS

The above-mentioned and other features and advantages of this disclosure, and the manner of attaining them, will become apparent and be better understood by reference to the following description of one aspect of the disclosure in conjunction with the accompanying drawings, wherein:

FIG. 3A is a graph showing pump laser formation.

FIG. 3B is a graph showing comb formation.

FIG. 3C is a graph showing single soliton formation.

FIG. 3D is a graph showing output using a battery.

FIG. 4C is a graph showing comb formation.

FIG. 4D is a graph showing single soliton formation.

DETAILED DESCRIPTION OF ILLUSTRATIVE EMBODIMENTS

Figure 1A:
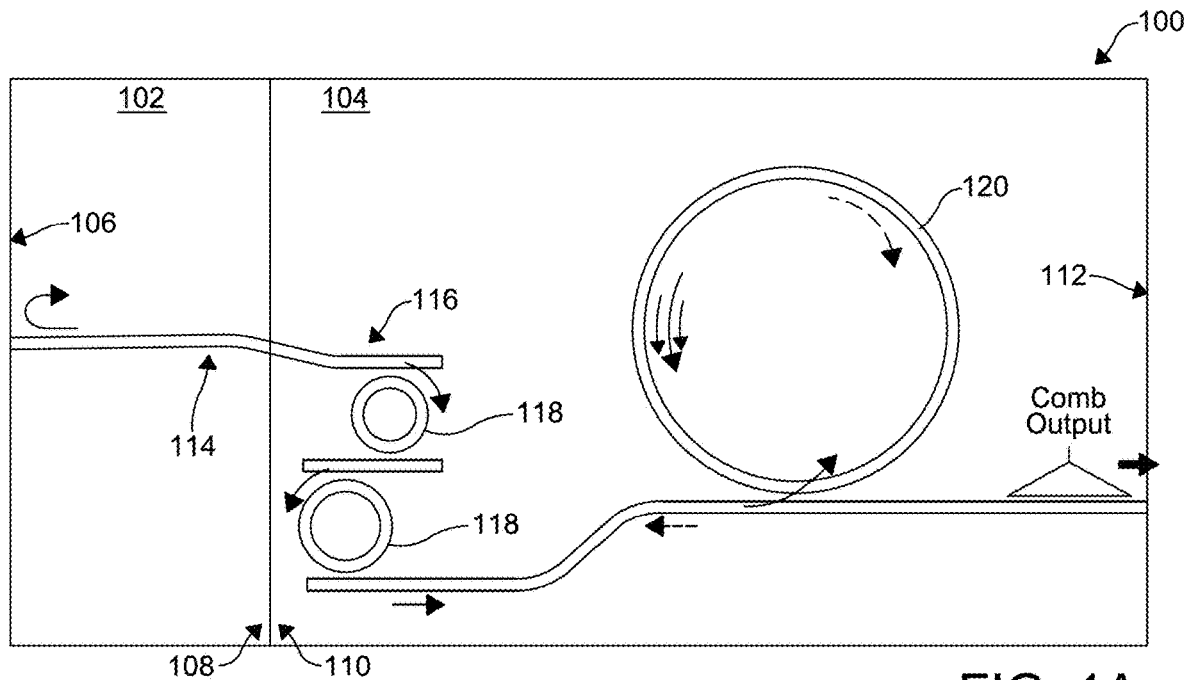
FIG. 1A is a diagram showing an example device configured for optical emission.

Disclosed are devices and methods for frequency comb generation. Frequency combs based on chip-scale microresonators offer the potential of high-precision photonic devices for time and frequency applications in a highly compact and robust platform. To date, however, all demonstrations have relied on bulky, expensive, power-hungry external pump lasers which prevents their realization for a wide variety of applications where size, portability and low power consumption are critical. Microresonator combs have been demonstrated on platforms including calcium fluoride, magnesium fluoride, silica, aluminum nitride, diamond, silicon and silicon nitride ($Si_3N_4$). $Si_3N_4$ in particular provides low loss, high nonlinearity, and compatibility with CMOS fabrication processes, making it a suitable material platform for frequency comb generation on-chip with bandwidths spanning more than an octave.

Disclosed herein is, inter alia, a fully integrated low-power consumption chip-scale platform for frequency comb generation. An example device can comprise an electrically pumped semiconductor laser integrated with a resonator (e.g., microresonator, microring, ring-shaped waveguide). The resonator can comprise a high quality factor (Q) $Si_3N_4$ resonator. The resonator can be configured as an external cavity for a reflective semiconductor optical amplifier (RSOA). The RSOA can be coupled to a chip comprising the resonator. The resonator can also be configured for generating a frequency comb.

Dispersion-engineered $Si_3N_4$ resonators can be used to achieve ultralow propagation loss without sacrificing the degree of confinement. As an example, low loss combined with the high confinement allows for comb generation with an oscillation threshold of 330 μW and ultra-narrow linewidth external cavity semiconductor lasers with linewidths on the order of 10 kHz.

The techniques disclosed herein are illustrated with an example (non-limiting) fabricated device. The device can comprise an integrated pump source. The integrated pump source can comprise, e.g., an electrically pumped RSOA, a pair of Vernier microring bandpass filters, and a high quality factor (high-Q) microring, as described further herein. The RSOA (e.g., Thorlabs SAF1126) can comprise a III-V gain chip coated on one edge for about 93% reflection. The filters' radii can be about 20 μm and about 22 μm, with free spectral ranges of about 9.5 nm and about 8.7 nm, respectively, at about 1550 nm. The filters can be fabricated with microheaters (e.g., enabling tunability of their resonances to select a single lasing mode within the gain bandwidth). The high-Q microring can act as an output reflector for the laser, as demonstrated herein, exhibiting about 20% reflection due to coupling of counter-propagating modes.

The filters and the high-Q microring can be disposed on an $Si_3N_4$ chip. The $Si_3N_4$ chip can be coupled to the RSOA using an inverse taper. The $Si_3N_4$ chip can be coupled to the RSOA using an inverse taper to match the $Si_3N_4$ waveguide mode to the RSOA mode (e.g., with 2 dB experimental coupling loss).

The high-Q microring can serve as the output reflector for the pump laser and as the frequency comb generator. The high-Q microring can be designed for phase matching and efficient parametric oscillation. The dimensions of the waveguide forming the microresonator comb source can be about 730 nm×about 2550 nm and are chosen by engineering the waveguide dispersion to be slightly anomalous with −80 ps$^2$/km group velocity dispersion as counterbalance to the normal material dispersion of the about $Si_3N_4$. The microring can have a Q of approximately 1.3×10$^7$.

The microring can be integrated with a microheater to enable high precision tunability, similar to the resonators forming the Vernier filters described above. It should be noted that the techniques described herein can be used fabricate devices with other dimensions and features as appropriate for a particular application.

FIG. 1A is a diagram showing an example device 100 configured for optical emission. The device 100 can comprise an integrated frequency comb source. The integrated comb source can comprise a laser cavity and a nonlinear microresonator for comb generation.

The device 100 can comprise a first portion 102. The device 100 can comprise a second portion 104. The first portion 102 can be coupled to (e.g., edge coupled adjacent to, in contact with, optically coupled to) the second portion 104. The first portion 102 can be directly attached to the second portion 104 without use of a coupling fiber. The first portion 102 can comprise a first chip (e.g., monolithically integrated circuit). The second portion 104 can comprise a second chip (e.g., monolithically integrated circuit).

The first portion 102 can comprise a first end 106 and a second end 108 opposite the first end 106. The second portion 104 can comprise a third end 110 and a fourth end 112 opposite the third end 110. The first end 106 of the first portion 102 can comprise a reflective material. The reflective material can be at least about 90% reflective. The first end 106 can be configured to reflect light back towards the second end 108. The second end 108 of the first portion 102 can comprise a transmissive material, a partially reflective material, and/or the like. The second end 108 can be configured to at least partially transmit light to the second portion 104. The first portion 102 and/or the second portion 104 can be integrated into a complimentary metal oxide semiconductor (CMOS) platform. The second portion 104 can comprise silicon nitride ($Si_3N_4$), Hydex glass (e.g., high index doped silica glass), silicon, aluminum nitride, aluminum gallium arsenide (AlGaAs), a combination thereof, and/or the like.

The first portion 102 can be configured as and/or comprise a gain medium, an optical amplifier, and/or the like. The first portion 102 can be configured as and/or comprise a reflective semiconductor optical amplifier (RSOA). The first portion 102 can comprise a semiconductor material, such as a III-V compound semiconductor.

A III-V compound semiconductor can comprise, e.g., a combination (e.g., alloy) of an element from the boron group (e.g., boron, aluminum, gallium, indium) of the periodic table and an element from the nitrogen group (e.g., nitrogen, phosphorus, arsenic, antimony) of the periodic table. Device 100 (e.g., the first portion 102) can comprise a first waveguide 114. The first waveguide 114 can comprise an optical waveguide. The first waveguide 114 can be configured to carry light from the first end 106 to the second end 108, and vice versa. The first portion 102 and/or first waveguide 114 can be configured to provide electrically-pumped optical gain.

Second portion 104 can comprise a second waveguide 116. The second waveguide 116 can comprise a plurality of waveguide sections. The second waveguide 116 can be coupled (e.g., edge coupled, optically coupled) to the first waveguide 114. The first waveguide 114 can be directly attached to second waveguide 114 without use of a coupling fiber. The second waveguide 116 can comprise silicon, nitrogen, a combination thereof, and/or the like. The second waveguide 116 can comprise silicon nitride ($Si_3N_4$), Hydex glass, silicon, aluminum nitride, aluminum gallium arsenide (AlGaAs), a combination thereof, and/or the like.

The second portion 104 can comprise one or more filters 118, such as optical filters. The one or more filters 118 can comprise a grating, a ring-shaped waveguide, a microring, a combination thereof, and/or the like. The one or more filters 118 can be optically coupled to the second waveguide 116.

The one or more filters 118 can be coupled in series to the second waveguide 116 (e.g., one filter can receive the output from another filter, and vice versa). The one or more filters 118 can be of different sizes. The one or more filters 118 can be tunable filters. The one or more filters 118 can be configured to allow wavelength selection. The one or more filters 118 can be configured to allow wavelength selection based on relative alignment (e.g., with each other). The one or more filters 118 can comprise silicon nitride ($Si_3N_4$), Hydex glass, silicon, aluminum nitride, aluminum gallium arsenide (AlGaAs), a combination thereof, and/or the like. The one or more filters can 118 be tuned using one or more heaters (e.g., resistive elements), such as the one or more heaters shown in FIG. 2A.

The second portion 104 can comprise a resonator 120, such as an optical resonator, microresonator, ring-shape waveguide, and/or the like. The resonator 120 can be within a range of about a micrometer to about a millimeter in size. For example, the resonator 120 can be a fraction (e.g., a third, a fourth, half) of a micrometer, several millimeters, and/or the like in size. The resonator 120 can comprise a nonlinear resonator 120. The resonator 120 can be configured to perform intermodulation, such as non-linear mixing, four-wave mixing, parametric four-wave mixing, and/or the like.

The resonator 120 can be configured to generate a frequency comb (e.g., based on optical input from the one or more filters 118. The resonator 120 can be larger than the one or more filters 118. The resonator 120 can be optically coupled (e.g., via the second waveguide 116) to at least one of the one or more filters 118. The resonator 120 can have dimensions optimized for a dispersion characteristic. The resonator 120 can be tuned using one or more heaters (e.g., resistive elements), such as the one or more heaters 202 shown in FIG. 2A. The resonator 120 can comprise silicon nitride ($Si_3N_4$), Hydex glass, silicon, aluminum nitride, aluminum gallium arsenide (AlGaAs), a combination thereof, and/or the like. The resonator 120 can comprise a different material than the one or more filters 118.

The resonator 120 can comprise a high quality factor (high-Q) resonator. A high-Q can comprise a quality factor (Q) high enough such that the nonlinear oscillation threshold power (e.g., which is a function of Q) is lower than the power that the laser can supply. The Q varies based on material, but as an example a high Q can comprise a Q greater than about 1 million (e.g., between about 1 million and about 2 million, between about 1 million and about 5 million, between about 1 million and about 10 million, between about 1 million and about 500 million, between about 1 million and about 100 million, between about 1 million and about 1 billion, between about 1 million and about 10 billion, between about 1 million and about 100 billion), a Q greater than about 100,000 (e.g., between about 100,000 and about 200,000, between about 100,000 and about 300,000, between about 100,000 and about 500,000, between about 100,000 and about 750,000, between about 100,000 and about 1 million), and/or the like.

The resonator 120 can be configured to partially reflect light to the one or more filters 118. The resonator 120 can be configured as a mirror of a laser cavity (e.g., with the other mirror being the first end 106). Coupling between counter-propagating modes can be used to configure the resonator 120 as a mirror.

Figure 1B:
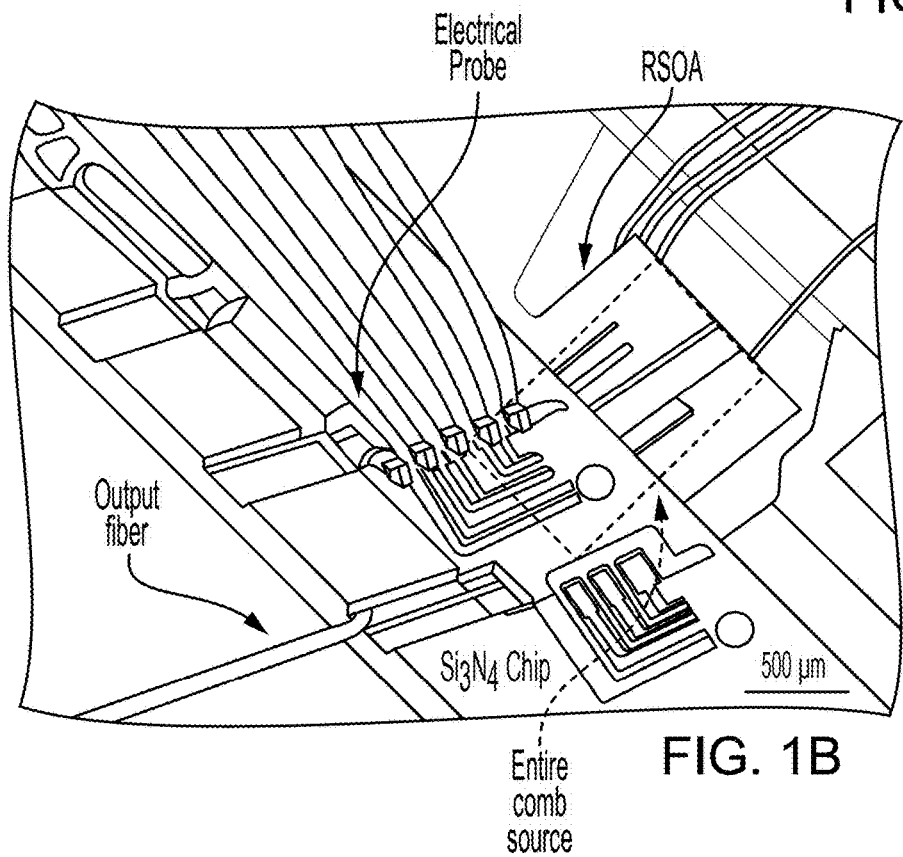
FIG. 1B is perspective view of an example device configured for optical emission.

FIG. 1B is a diagram showing an example device configured for optical emission. A representation of photograph of a chip-scale fully integrated comb source is shown. An RSOA and microheaters are interfaced with wirebonds and a probe to electrically pump and tune the comb. The output is measured using an optical fiber coupled to the output waveguide.

Figure 2A:
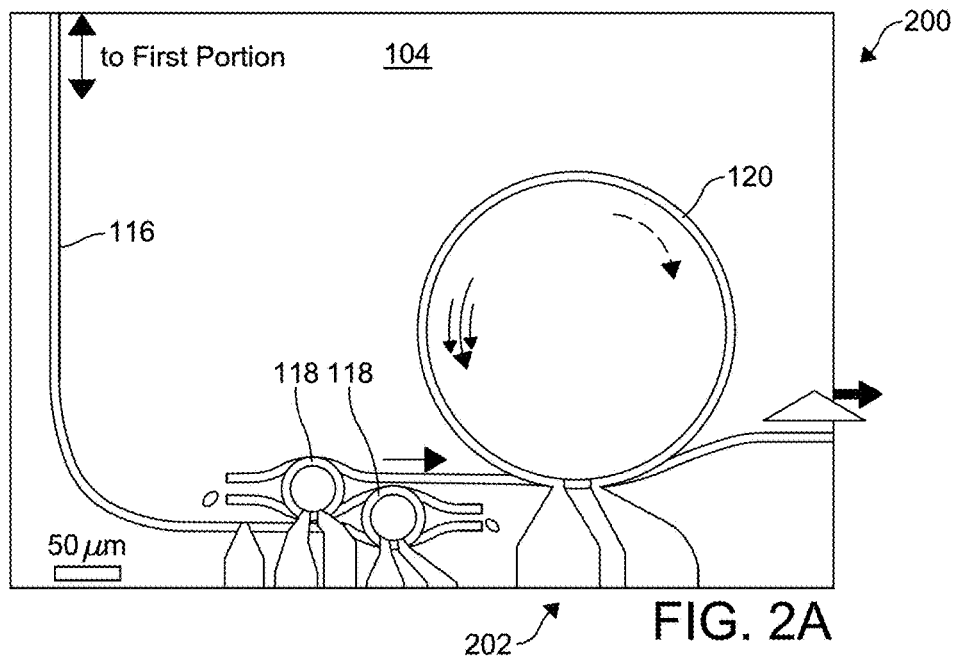
FIG. 2A shows another example device configured for optical emission.

FIG. 2A shows another example device 200 configured for optical emission. The example device 200 can be implemented as an integrated III-V/$Si_3N_4$ laser design. FIG. 2A represents a microscope image showing at least a part of an example device. A first portion 102 (not shown) (e.g., gain medium, RSOA, first portion 102) can be coupled to a second portion 104 (e.g., an external cavity, a $Si_3N_4$ laser cavity). The device 200 can comprise one or more heaters 202. The one or more heaters 202 can be resistive heaters, metal heaters, wires, and/or the like. The one or more heaters 202 can comprise integrated heaters disposed above the resonator 120, the one or more filters 118, the second waveguide 116, a combination thereof, and/or the like. The one or more heaters 202 can be used for phase-tuning one or more section of the laser cavity. The one or more heaters 202 can tune the second waveguide 116. The one or more heaters 202 can tune the one or more filters 118. The one or more heaters 202 can tune the resonator 120.

Figure 2B:
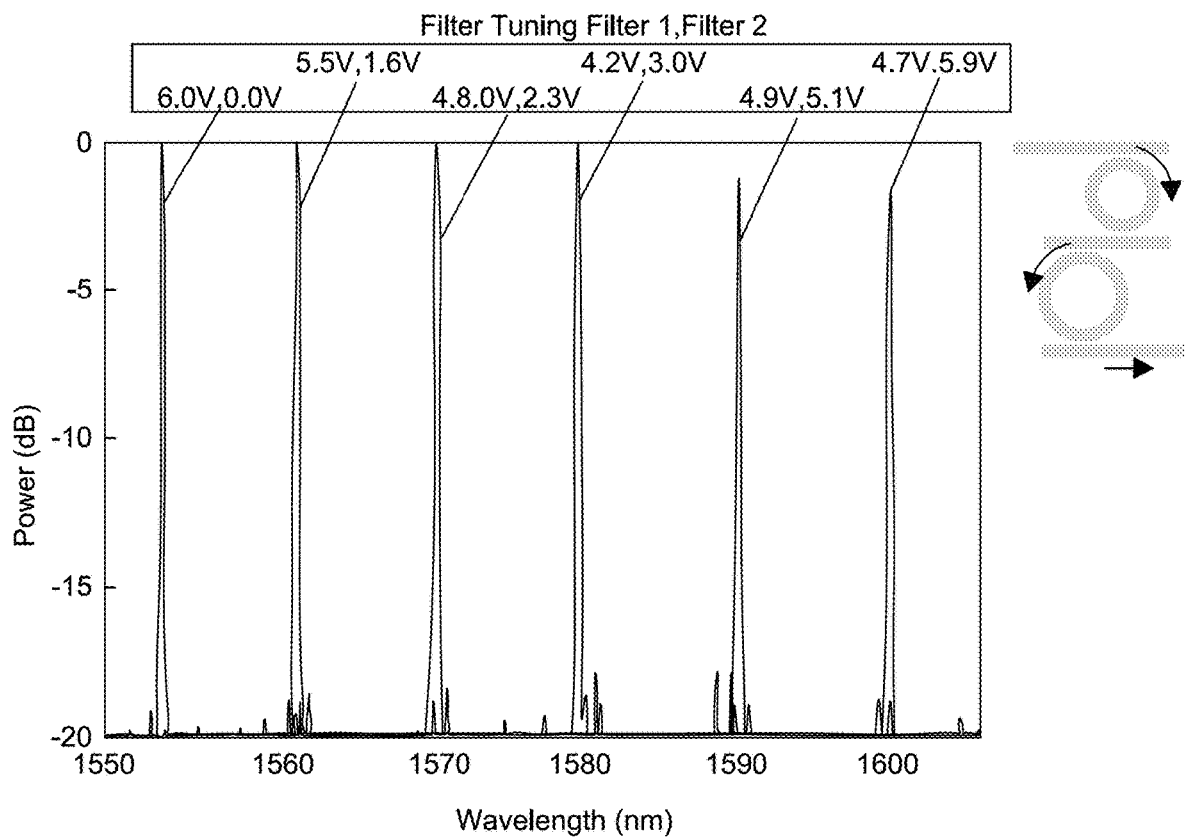
FIG. 2B is a graph showing filter tuning.
Figure 2C:
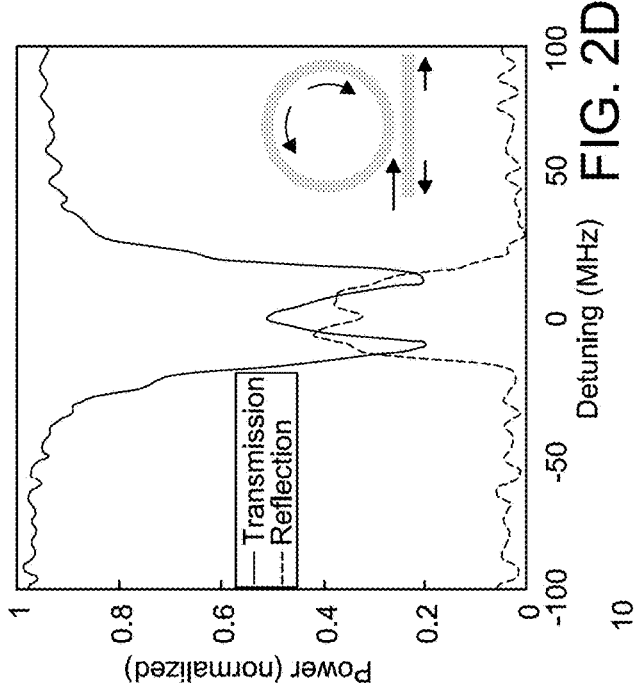
FIG. 2C is a graph showing wavelength and power.
Figure 2D:
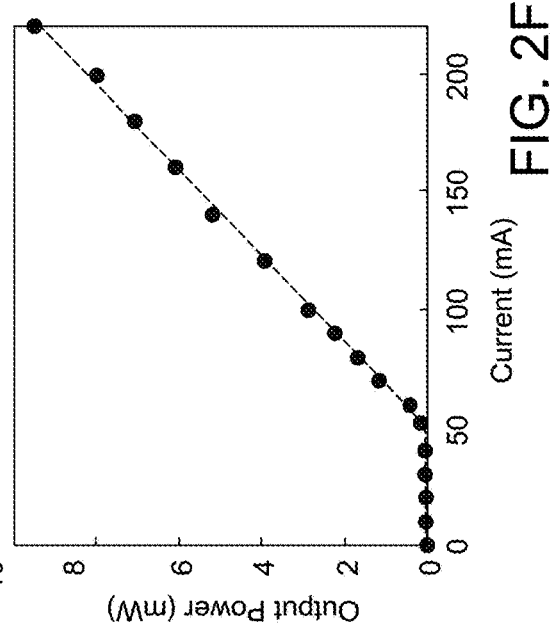
FIG. 2D is a graph showing detuning.

FIGS. 2B-2C show measured transmission spectrum for Vernier filter rings comprised in an example device. FIG. 2B is a graph showing filter tuning of an example device. FIG. 2C is a graph showing wavelength and power of an example device. By adjusting the relative detuning of the filters, a single transmission wavelength can be selected within the broad gain bandwidth of the RSOA. (e.g., H1=Heater power for filter 1, H2=Heater power for filter 2). FIG. 2D is a graph showing detuning of an example device. In FIG. 2D, measured optical transmission and reflection spectra of the high-Q microresonator are shown. The 32-MHz resonance bandwidth reveals a Q of $8\times10^6$. The narrowband reflection is generated by coupling via Rayleigh scattering between counter-propagating beams in the ring, which is apparent due to the slight resonance splitting observed from these degenerate beams.

Figure 2E:
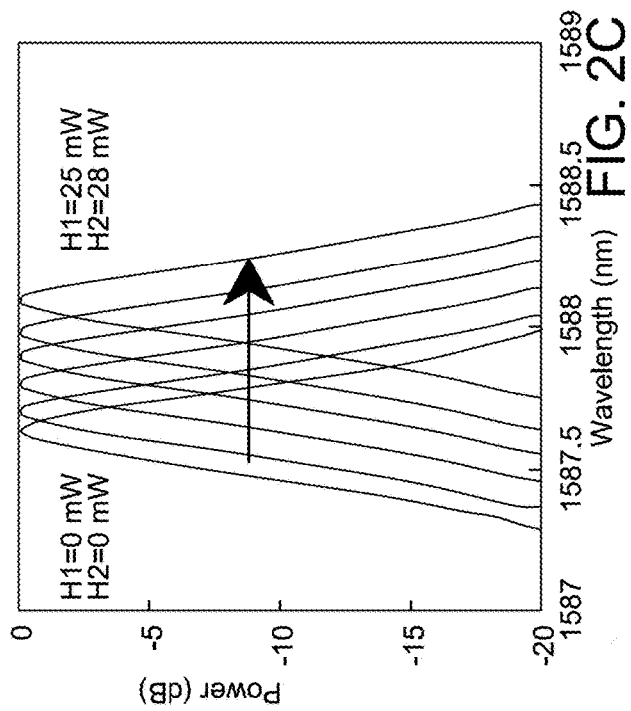
FIG. 2E is a graph showing single mode lasing.
Figure 2F:
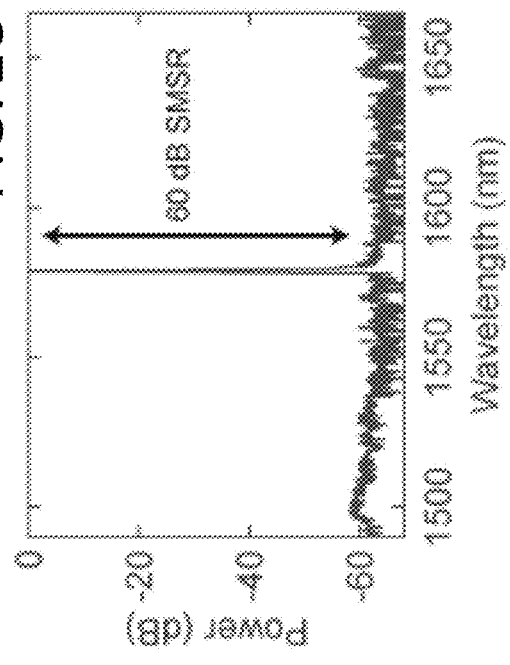
FIG. 2F is a graph showing optical power and pump current.

FIG. 2E is a graph showing single mode lasing of an example device. Laser output spectrum is represented showing single-mode lasing with over 60 dB side-mode suppression ratio (SMSR). FIG. 2F is a graph showing optical power and pump current of an example device. The graph shows output optical power of laser versus pump current at 1580 nm.

FIGS. 3A-C shows spectra of output from comb source as measured by an optical spectrum analyzer (OSA) at varying stages of comb generation with corresponding RF spectra. FIG. 3A is a graph showing pump laser formation. Spectrum of laser output before tuning fully into resonance. On the right panel is shown RF noise. The RF noise is low because there is only single frequency lasing. FIG. 3B is a graph showing comb formation. By detuning the microresonator resonance using the integrated microheater, a frequency comb forms. The same can be achieved for red-shifting the pump wavelength relative to the microresonator resonance using the cavity phase shifter. On the right panel is shown that beating (e.g., since the comb is not yet mode-locked) between different comb lines produces high RF noise below 200 MHz FIG. 3C is a graph showing single soliton formation. Single-soliton frequency comb is achieved by tuning the microresonator such that the pump is slightly red-detuned from the resonance. The spectral envelope matches Fourier transform of the expected characteristic soliton such profile. The inset shows the signal-to-noise ratio of the central individual comb lines is approximately 50 dB (e.g., the laser linewidth is below the OSA resolution, but was separately measured to be 40 kHz). One the right panel, the RF spectrum confirms the transition to a low-noise state. The resolution bandwidth used for all RF spectra is 100 kHz. FIG. 3D is a graph showing output using a battery. Frequency comb generated with D cell battery supplying pump power of 84 mW is shown. On the right panel is shown a diagram of test setup.

Figure 4A:
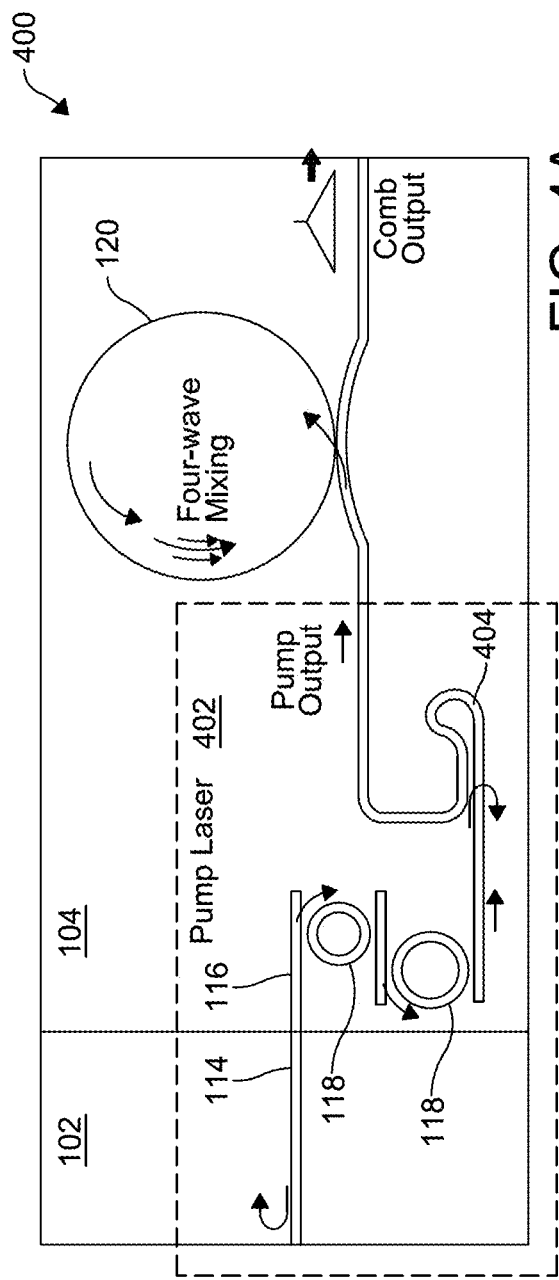
FIG. 4A shows another example device configured for optical emission.

FIG. 4A shows another example device 400 configured for optical emission. The device 400 can be configured based on an external pump scheme. The device 400 can include any of the features of the device 100 and/or the device 200 described herein. The device 400 can comprise a pump laser 402 (e.g., integrated pump laser). The pump laser 402 can be separate from the resonator 120. The device 440 can comprise a mirror 404 (e.g., output mirror of the pump laser 402). The mirror 404 can be partial reflective, partially transmissive, and/or the like. The mirror 404 can be coupled between the one or more filters 118 and the resonator 120. The mirror 404 can comprise a Sagnac loop mirror, distributed bragg reflector, a combination thereof, and/or the like.

Figure 4B:
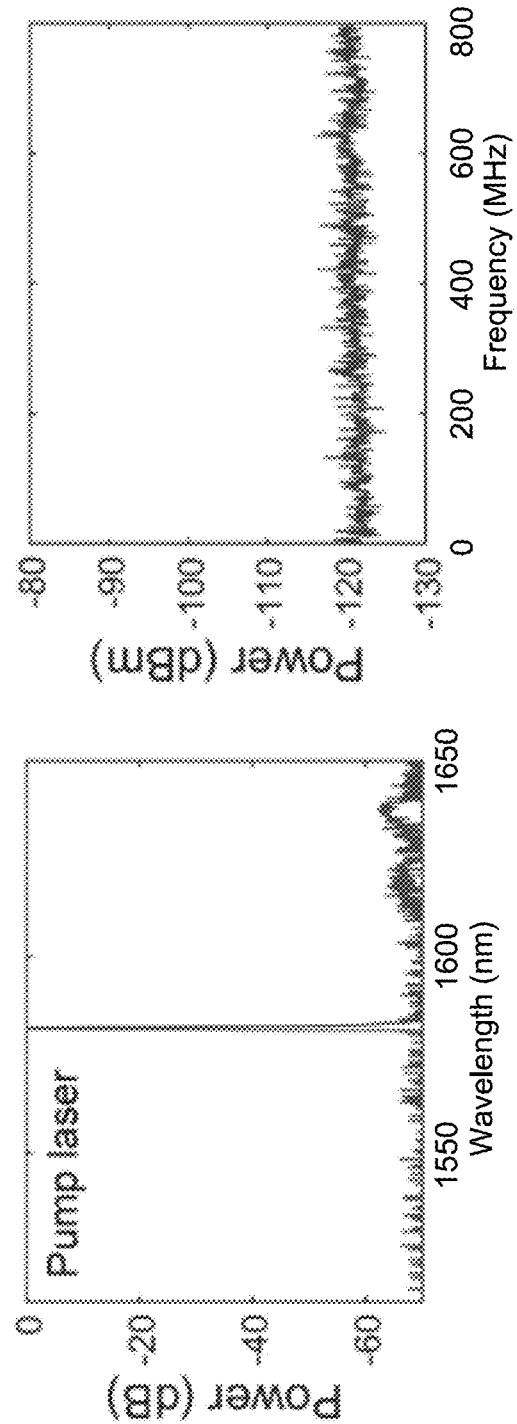
FIG. 4B is a graph showing pump laser formation.

FIGS. 4B-4D show spectra of output from an example comb source as measured by an OSA at varying stages of comb generation with corresponding RF spectra. FIG. 4B is a graph showing pump laser formation. Spectrum of laser output before tuning fully into resonance. The RF noise is low because there is only single frequency lasing. FIG. 4C is a graph showing comb formation. By detuning the microresonator resonance using the integrated microheater, a frequency comb begins to form. The same is also achieved for red-shifting the pump wavelength relative to the microresonator resonance using the cavity phase shifter. Because this comb is not yet mode-locked, beating between different comb lines produces high RF noise.

FIG. 4D is a graph showing single soliton formation. Multi-soliton frequency comb achieved by tuning the microresonator such that the pump is slightly red-detuned from the resonance. The RF spectrum confirms the low-noise state. The resolution bandwidth is 100 kHz.

Additional details and embodiments of the devices disclosed herein are further described below. Optical frequency combs are coherent multi-wavelength sources that enable unprecedented precision in frequency and timing for an array of applications[1-8]. Kerr frequency combs in microresonators can rely on a single-frequency pump laser and have offered the promise of highly compact, scalable, and power efficient devices. Disclosed herein is an integrated Kerr frequency comb source based on extremely low-loss silicon nitride waveguides that can form both the microresonator and an integrated laser cavity. The disclosed devices can generate low-noise soliton-modelocked combs. For example, a frequency comb using the disclosed device can span over about 100 nm using only about 130 mW of electrical pump power. The disclosed devices can comprise a dual-cavity configuration, which demonstrates the flexibility afforded by full integration. The realization of a fully integrated Kerr comb source with ultra-low power consumption provides highly portable and robust frequency and timing references, sensors, and signal sources and enables new tools to investigate the dynamics of comb and soliton generation through close chip-based integration of microresonators and lasers.

Silicon nitride ($Si_3N_4$) microresonators can have record low parametric oscillation thresholds[21] due the high quality factors (e.g., $Q>3\times10^7$), high nonlinearity (e.g., $n_2\sim2.4\times10^{-19}$ $m^2/W$), and small mode volume (e.g., ring radius ~100 μm). Additionally, due to $Si_3N_4$'s high index of refraction (e.g., $n\sim2.0$) and low loss, compact, tunable $Si_3N_4$ laser cavities with narrow linewidth can be achieved[29,39]. $Si_3N_4$ is a CMOS-compatible deposited material that can be fabricated at wafer scale. The combination of efficient comb generation and available integration of active devices as disclosed herein make it an ideal platform for complete integration of optical frequency combs.

The devices disclosed herein can comprise a Kerr comb source. The Kerr comb source can be on a fully integrated $Si_3N_4$ platform. The device can comprise a compact, low-power, electrically-pumped source. As an example, a gain section based on a III-V reflective semiconductor optical amplifier (RSOA) can be coupled to a $Si_3N_4$ laser cavity. The laser cavity can comprise two filters (e.g., Vernier microring filters). The filters can be configured for wavelength tunability.

The laser cavity can comprise a resonator. The resonator can comprise a non-linear resonator, a microresonator, a high-Q resonator, a combination thereof, and/or the like. The resonator can be configured (e.g., dimensioned, tuned to) to generate a narrowband back-reflection. The narrowband back-reflection can be due to Rayleigh scattering[15]. The resonator can be configured (e.g., or function) as an output mirror of the pump laser cavity[29]. The resonator can generate a frequency comb through parametric four-wave mixing. In this way, the comb generation and pump laser are inherently aligned, which can be shown using resonators in fiber laser cavities with fiber amplifiers[17,31]. Fully integrating the comb source allows the flexibility to use such a configuration, avoiding the typical chain of discrete components found in previous Kerr comb demonstrations. As shown in FIG. 1B, an example device (e.g., an assembled millimeter-sized comb source) can have only electrical inputs and an optical output.

The laser cavity can be configured to provide tunable, single-mode lasing. The laser cavity can provide sufficient pump output power for comb generation in the resonator. The lasing wavelength can be controlled by the alignment of two filters (e.g., two microring Vernier filters[27]). The two filters can be aligned with one of the modes of the resonator as shown in FIG. 2A. The filters' radii can be 20 μm and 22 μm, corresponding to free spectral ranges (FSR) of 1.18 THz and 1.07 THz, respectively, which results in transmission at only a single frequency when the filters are aligned. The filters' resonance positions can be widely tuned using integrated resistive microheaters, as shown in FIG. 2b-C. The filters' transmission bandwidth can be configured to have a full-width half-maximum (FWHM) of 15 GHz. The filters' transmission bandwidth can be configured to have a full-width half-maximum (FWHM) of 15 GHz by ensuring strong coupling to the add and drop waveguides with a 5 μm coupling length.

The optical gain in the laser cavity can come from electrical pumping of the III-V semiconductor based waveguide on the RSOA. The RSOA can be coupled to a $Si_3N_4$ cavity (e.g., or chip, such as section portion 104) on one end and strongly reflects at the opposite end. The output coupler of an example laser cavity can comprise a 120 μm radius resonator (e.g., microresonator). The resonator can have a measured reflection of 40% on resonance (due to coupling between counter-propagating circulating beams resulting from Rayleigh scattering[29]), as shown in FIG. 2D. This level of reflection allows for high laser output power due to the high roundtrip gain of the RSOA. The measured transmission spectrum of the microresonator (e.g., as shown in FIG. 2D) corresponds to an intrinsic Q of $(8.0\pm0.8)\times10^6$. Based on this Q and the anomalous group-velocity dispersion for the 730×1800 nm waveguide, simulations indicate that a soliton-state frequency comb can be generated at 1 mW of pump power.

An example disclosed device is shown in FIG. 2F, lasing with up to 9.5 mW output optical power using an integrated $Si_3N_4$ laser. To characterize the laser, one can operate the resonator slightly detuned from resonance to ensure that only lasing occurs and a frequency comb is not generated. One can observe lasing with over 60 dB side-mode suppression ratio (SMSR) (e.g., as shown in FIG. 2E).

As shown in FIG. 2F, the lasing threshold is 49 mA, with a slope efficiency of 52 mW/mA. The maximum on-chip output power of 9.5 mW is obtained at 277 mW (220 mA) electrical pump power. This corresponds to a 3.4% wall-plug efficiency. Additionally, one can measure a narrow laser linewidth of 40 kHz using the delayed self-heterodyne method. The relatively high output power and narrow linewidth is competitive with those of many bulk pump lasers, yet is significantly more compact and power efficient.

Using the disclosed techniques, an example device can generate a Kerr frequency comb spanning 100 nm and achieve a mode-locked, single-soliton state at 130 mW electrical pump power consumption, enabling battery-operation applications. At 1.1 mW optical output laser power (e.g., corresponding to 78 mW electrical power), new frequencies begin to appear due to parametric four-wave mixing in the resonator.

One can then monitor the comb formation as the resonator is tuned into the lasing mode's wavelength using a fixed electrical pump power of 130 mW. In order to generate the comb, the resonator is roughly aligned with the filters such that lasing occurs at 1579 nm with 2.5 mW output power, with the lasing wavelength slightly blue-detuned (e.g., as shown in FIG. 3A). As the microresonator is tuned into resonance, greater circulating power leads to comb formation, accompanied by high RF noise (e.g., as shown FIG. 3B). Tuning the resonance further, results in stable, smooth spectral profile combs with spectral envelopes characteristic of temporal cavity solitons. One can measure a single soliton state frequency comb (e.g., as shown in FIG. 3C) with an associated drop in RF noise.

Once generated, the solitons exhibit stable behavior without feedback electronics or temperature control, with no visible changes in the optical spectrum or output power until intentionally detuned. The signal-to-noise ratio of the central comb lines is approximately 50 dB, more than sufficient for spectroscopy applications. One can additionally show battery-operation of the comb source by supplying the pump current using a standard D battery at 84 mW of pump power (e.g., as shown in FIG. 3D). At typical battery capacity (e.g., 17,000 mAh), the comb can be powered continuously for over 200 hours. Combs were also generated using a smaller AAA battery. These exemplary results represent unprecedented low power consumption for generating Kerr frequency combs and solitons with an integrated microresonator.

To show the versatility of this platform, also demonstrated is a more traditional but fully integrated configuration where the comb is generated in a resonator (e.g., microresonator) that is different than the one used to generate the laser. In this second configuration, shown in FIG. 4A, the pump laser is distinct from the resonator (e.g., high-Q microresonator). The filters (e.g., Vernier filters) and RSOA can function the same as the device of FIGS. 1A and 2A. A partially transmitting mirror (e.g., Sagnac loop mirror) can be included to serve as an output coupler. The partially transmitting mirror can be configured with about 20% reflection. The partially transmitting mirror can have a broadband reflection. Tunable lasing can take place independent of the resonance position of the comb microresonator (e.g., since this mirror has a broadband reflection).

With the resonator fully off-resonance, one can measure single-mode lasing with 4.9 mW output power and over 60 dB SMSR (e.g., as shown in FIG. 4B) at 162 mW electrical pump power. By tuning the microresonator into resonance with the laser wavelength, one can generate a frequency comb spanning 110 nm (e.g., as shown in FIG. 4C). By further tuning into resonance such that the laser is red-detuned, one can observe multiple soliton state frequency combs spanning over 130 nm with the characteristic drop in RF noise (e.g., as shown in FIG. 4D). The comb generation process in this second design is an improvement over prior comb generators at least because it brings a high level of integration which affords greater flexibility in laser design and reduced power consumption.

The disclosed devices comprise what is believed to be the first fully integrated Kerr frequency comb source, based on a $Si_3N_4$ laser cavity and high-Q microresonator. The comb source can generate temporal cavity solitons with low electrical power consumption in a compact form. The high level of integration (e.g., integration on a single chip of the resonator and filters) can enable new flexibility in designing the pump laser for generating the frequency comb. Other example configurations of the disclose device can comprise an inherently aligned comb source enabled by a feedback reflection configuration and a traditional modular configuration. Furthermore, an example platform described herein can be CMOS-compatible for wafer-scale fabrication of robust, fully integrated photonic chips, enabling wide deployment of precision references and sensors. The realization of a mode-locked Kerr frequency comb on an integrated platform provides opportunities to many fields that rely on the precision and stability of frequency combs and solitons, including sensing, metrology, communications, and waveform generation. The low power consumption of the platform enables battery-powered and mobile systems, no longer relying on external lasers, movable optics, and laboratory set-ups.

Methods

Fabrication of an example device as disclosed herein is described as follows. An example $Si_3N_4$ chip can be fabricated[21] by first growing about 4 μm of $SiO_2$ on a crystalline silicon wafer using thermal oxidation to form the bottom cladding of the waveguides. Then, about 730 nm of silicon nitride is deposited using low pressure chemical vapor deposition. The wafer is annealed at in three stages to remove hydrogen impurities. The waveguides are then patterned using electron beam lithography and etched using $CHF_3$ plasma etching.

The waveguides are clad with about 2 μm $SiO_2$. The microheaters are finally placed over the waveguides using about 100 nm of sputtered platinum (with a titanium adhesion layer) and lift-off patterning. This process can define a single integrated chip that can be coupled to another chip, such as a gain chip.

Coupling of the integrated chip and a gain chip is described as follows. An example III-V RSOA gain chip can be a commercially available chip from Thorlabs (e.g., SAF 1126) that provides broad gain near about 1550 nm. A first side of the gain chip can have about 93% reflection. A second side of the gain chip can be anti-reflection coated. This second side can be coupled to the $Si_3N_4$ chip with the waveguides angled relative to the facets to further prevent reflections[29]. The $Si_3N_4$ chip can be polished up to the end of a tapered about 280-nm wide waveguide which is simulated to have less than about 1 dB coupling loss to the mode of the RSOA waveguide. The two chips can be attached and aligned. The two chips can be attached and aligned using three-axis stages with micrometers. One can measure an experimental about 2 dB coupling loss.

The RSOA can be wirebonded to an electrical connector for supplying the pump current. The pump current can be supplied from either a Keithley 2400 Sourcemeter, a D/AAA battery, or other source. The $Si_3N_4$ chip's microheaters can be connected to pads and interfaced with a DC wedge probe (GGB Industries) and controlled by a DAC (Measurement Computing).

An example device can comprise: 1. a gain medium (in an exemplary case an RSOA, but it can be integrated for example on the silicon chip), 2. filter(s) (e.g., in an exemplary case microring filter(s) because they are easily tunable, but other filters can be used such as a grating), 3. a pair of mirrors forming the cavity, 4. (optionally or alternatively) a mechanism to tune the phase of the cavity (e.g., a thermo-optic heater), or a combination thereof. After the pump laser, there can be a high-Q resonator (e.g., microring) for generating the comb.

The Kerr frequency comb can be generated by the nonlinear process of four wave mixing. Silicon nitride has a strong $\chi(3)$ nonlinearity, low losses, and can be designed to have waveguide dimensions (a specific thickness) that allow for dispersion engineering. The about 730 nm height used is exemplary, and is optimized for the desired dispersion in the material. In this case, the dispersion is anomalous. The dispersion can be adjusted based on the width of the waveguide in the resonator.

One can also generate a comb with normal dispersion. The generation of the comb makes the resonator an optical parametric oscillator (OPO). In addition to silicon nitride, other materials can be used to form both the laser cavity and the OPO. The other materials resonator have one or more of the following properties: 1. a reasonably high index contrast so that compact devices such as filters can be included (e.g., in an exemplary case n=2.0 vs 1.44 cladding), 2. a strong X3 nonlinearity, 3. low propagation loss (e.g., waveguides are smooth and don't absorb in the relevant wavelength), and 4. dimensions can be designed (e.g., thickness, width).

The example device in FIG. 1A can be similar to the device in FIG. 4A, except that instead of the OPO following the pump laser, it is part of the pump laser. The Sagnac loop mirror can be removed and instead the resonator (e.g., OPO ring) can provide the backreflection. Because of the filters, only the pump can be transmitted back from the backreflection to the gain medium. The other comb lines can substantially not back reflect. Thus, the pump wavelength lasers, generating the comb in the high Q ring, and a comb of frequencies is output.

With both versions a dissipative Kerr soliton can be generated by the OPO. (e.g., This can be done by adjusting the detuning of the high Q ring and laser pump and tuning quickly towards the resonance).

The gain section can have a mirror on one end (as shown), or, if integrated on the silicon chip, can be a separate mirror like a Sagnac loop or DBR. It can alternately have the order of elements swapped, such that the mirror on RSOA is the output mirror, with a lower than 100% reflection and the rest transmitted. Then, the mirror on the other side of the microring filters would probably be 100% (or substantially) reflecting. It is important in some implementations that the laser cavity has mirrors on the ends (e.g., one of which is close to 100% reflecting and the other being partially transmitting, e.g. R~20%-80%, or even 5-95%) and in-between is a gain section and tunable filter(s).

In either configuration (e.g., FIG. 1A or FIG. 4A), the number of filters (e.g., or filter rings) can be one instead of two. Multiple combs can be generated for use in Dual Comb Spectroscopy (e.g., using multiple lasers, using multiple comb rings, or even a single ring).

As described above, the provided results and data of an example fabricated device demonstrate ultra-low electrical power consumption for frequency comb generation enables battery-operated comb sources and provides a new regime of ultra-compact and portable systems for spectroscopy, sensing, communications, and timing metrology. As summary of these results, a broad bandwidth frequency comb in a low-noise soliton state is shown using only 2.5 mW and 130 mW of optical and electrical pump power, respectively. When the high-Q microresonator is tuned out of resonance with the laser, one can observe single-mode lasing with over 60 dB of side-mode suppression, as seen in the optical and electrical spectrum analyzer scans in FIGS. 2A-2B. The example laser gives up to 4.6 mW optical power at 120 mA (1.04 V), a 3.7% efficiency. When one tunes the microresonator to be in resonance with the pump laser frequency, the electrical power consumed by the gain section is 130 mW (corresponding to 2.5 mW optical pump output) and one can observe generation of comb lines first in a high-noise state (FIGS. 2C-2D). As one tunes the microresonator further into resonance, one can observe a stable single-soliton comb spanning over about 90 nm from about 1540 to about 1630 nm (FIGS. 2E-F). FIG. 2d and FIG. 2F show the transition to the soliton state where the radio-frequency (RF) power drops about 15 dB. The dip near 1600 nm in FIG. 2E corresponds to a waveguide mode crossing.

ADDITIONAL ASPECTS AND EMBODIMENTS

The laser and nonlinear resonator (e.g., microresonator, microring) can be wholly or substantially separate. An example device can comprise a laser (e.g., a millimeter scale laser). The laser can be a planar integrated laser, such as a common semiconductor laser diode. The laser can be implemented in a material platforms that can comprise InP, AlGaAs, and/or the like. The laser can comprise an optical cavity. In the optical cavity, light can be reflected at opposing ends and/or recirculates through a gain medium. The gain medium can be electrically pumped (e.g., in a semiconductor laser). An output of the laser can be coupled to a resonator, such as a nonlinear resonator, microresonator, a combination thereof, and/or the like. The resonator can be coupled to the laser via a waveguide. The resonator can be coupled to the laser without using an optical fiber. The resonator and/or its material platform can be chosen/designed to have a sufficiently strong nonlinearity, loss, size, and coupling such that a frequency comb can be generated with the power available from the laser. The resonator coupling can be determined lithographically (e.g., rather than by alignment between the resonator and a separate structure).

The resonator and the waveguide can be planar or substantially planar. The resonator and the waveguide can be fabricated on a CMOS compatible platform, such as silicon nitride. The laser can be coupled to the resonator and the waveguide using edge coupling, vertical coupling, spot-size converters, or other methods for transferring light from chip to chip. The laser can be integrated monolithically on the same substrate as the nonlinear resonator, such as by bonding the material to form the laser.

The gap/coupling between the resonator and waveguide/laser can be lithographically defined (e.g., or at least in the same structure). Previous conventional couplings used a ring in one material coupled to a separate structure (e.g., the problem is the gap can become misaligned and change with vibrations, etc). Coupling a laser to a microresonator configured as a comb is new and nonconventional. Previous comb generation in rings used external big lasers coupled to the chip with fiber or free space lenses.

The present disclosure relates to at least the following aspects.

Aspect 1. A device, comprising, consisting of, or consisting essential of: an optical amplifier comprising a reflective end and a transmissive end; and a laser cavity adjacent the optical amplifier and configured to receive an output from the optical amplifier, wherein the laser cavity comprises: one or more microrings configured as tunable optical filters; and a microresonator (e.g., or resonator, microring, ring-shaped waveguide) configured to receive an output of the one or more microrings and output, based on parametric multiwave mixing, a frequency comb.

Aspect 2. The device of Aspect 1, wherein one or more of the microresonator and the one or more microrings comprise one or more of silicon nitride, silicon, diamond, lithium niobate, aluminum nitride, aluminum gallium arsenide, or glass.

Aspect 3. The device of any one of Aspects 1-2, wherein the optical amplifier comprises a waveguide comprising a III-V semiconductor material. The semiconductor material can comprise indium phosphide, gallium arsenide, gallium nitride, gallium phosphide, and/or the like.

Aspect 4. The device of any one of Aspects 1-3, further comprising one or more resistive microheaters configured to tune one or more of the microresonator or the one or more microrings.

Aspect 5. The device of any one of Aspects 1-4, wherein the one or more microrings are configured, based on an alignment relative to each other, to perform wavelength selection.

Aspect 6. The device of any one of Aspects 1-5, wherein the microresonator comprises a nonlinear microresonator.

Aspect 7. The device of any one of Aspects 1-6, wherein one or more of the microrings comprises a Vernier microring filter.

Aspect 8. The device of any one of Aspects 1-7, wherein the parametric multiwave mixing comprises parametric four-wave mixing.

Aspect 9 The device of any one of Aspects 1-8, wherein laser cavity is adjacent the transmissive end of the optical amplifier.

Aspect 10. The device of any one of Aspects 1-9, wherein the frequency comb comprises a Kerr frequency comb.

Aspect 11. The device of any one of Aspects 1-10, wherein the one or more microrings comprises a first microring serially coupled to a second microring, and wherein the one or more microrings are serially coupled to the microresonator.

Aspect 12. The device of Aspect 11, wherein the second microring is larger than the first microring and within a threshold size of the first microring, and wherein the microresonator is larger than the second microring.

Aspect 13. The device of any one of Aspects 1-12, further comprising a pump a Sagnac loop mirror optically coupled between an output of the one or more microrings and the microresonator.

Aspect 14. The device of any one of Aspects 1-13, wherein the microresonator comprises a high-Q microresonator. A high Q can be a Q high enough such that the nonlinear oscillation threshold power (e.g., which is a function of Q) is lower than the power that the laser can supply. The Q varies based on material, but as an example a high Q can comprise a Q greater than about 1 million, a Q greater than about 100,000, and/or the like.

Aspect 15. The device of any one of Aspects 1-14, wherein the microresonator is configured to generate a narrowband back-reflection due to Rayleigh scattering.

Aspect 16. The device of any one of Aspects 1-15, wherein the microresonator is configured to function as an output mirror of the laser cavity.

Aspect 17. The device of any one of Aspects 1-16, wherein the optical amplifier is configured to receive a pump current.

Aspect 18. The device of any one of Aspects 1-17, wherein the frequency comb comprises a soliton-modelocked comb. The frequency comb can have a range of about 1 THz (10 nm) or greater than about 10 THz (100 nm). The upper limit of the range can be about 200 nm in the present examples. The upper limit can be about 200 THz. The frequency comb can be very narrow (e.g. several lines, which depending on the spacing (e.g., 200 GHz/1.6 nm in an exemplary case) can be about 10 nm). In some implementations, a broader frequency comb can be used, such as about 800 nm to about 2 um.

Aspect 19. The device of any one of Aspects 1-18, wherein the one or more microrings and the microresonator are integrated into a complimentary metal oxide semiconductor (CMOS) platform.

Aspect 20. A device, comprising, consisting of, or consisting essential of: one or more optical filters, wherein the one or more optical filters are configured to be coupled to an optical amplifier; and a microresonator (e.g., or resonator, microring, ring-shaped waveguide) configured to receive an output of the one or more optical filters and output, based on parametric multiwave mixing, a frequency comb, wherein the one or more optical filters and the microresonator are integrated into a single chip.

Aspect 21. The device of Aspect 20, wherein the one or more optical filters comprise one or more of a grating or a ring-shaped waveguide.

Aspect 22. The device of any one of Aspects 20-21, further comprising a reflective portion disposed in one or more of the optical amplifier or a medium comprising the microresonator.

Aspect 23. The device of Aspect 22, wherein the reflective portion and the microresonators function as mirrors.

Aspect 24. The device of any one of Aspects 22-23, wherein reflective portion comprises an end of the optical amplifier adjacent the medium.

Aspect 25. A device, comprising, consisting of, or consisting essential of: A first portion comprising an optical amplifier and a transmissive end; and a second portion adjacent the transmissive end of the first portion and configured to receive an output from the optical amplifier, wherein the second portion comprises: one or more tunable optical filters; and a microresonator (e.g., or resonator, microring, ring-shaped waveguide) configured to receive an output of the one or more microrings and output, based on parametric multiwave mixing, a frequency comb.

Aspect 26. The device of Aspect 25, wherein one or more of the microresonator and the one or more tunable optical filters comprise silicon nitride.

Aspect 27. The device of any one of Aspects 25-26, wherein the optical amplifier comprises a waveguide comprising a III-V semiconductor material.

Aspect 28. The device of any one of Aspects 25-27, further comprising one or more resistive microheaters configured to tune one or more of the microresonator or the one or more tunable optical filters.

Aspect 29. The device of any one of Aspects 25-28, wherein the one or more tunable optical filters are configured, based on an alignment relative to each other, to perform wavelength selection.

Aspect 30. The device of any one of Aspects 25-29, wherein the first portion comprises a mirror configured to reflect light back to the transmissive end.

Aspect 31. The device of any one of Aspects 25-30, wherein one or more of the tunable optical filters comprises one or more of a plurality of microrings or a Vernier microring filter.

Aspect 32. The device of any one of Aspects 25-31, wherein the one or more optical filters and the microresonator are integrated into a single chip.

Aspect 33. The device of any one of Aspects 25-32, wherein the transmissive end is a transmissive end of the optical amplifier.

Aspect 34. The device of any one of Aspects 25-33, wherein the frequency comb comprises a Kerr frequency comb.

Aspect 35. The device of any one of Aspects 25-34, wherein the one or more tunable optical filters comprises a first microring serially coupled to a second microring, and wherein the one or more microrings are serially coupled to the microresonator.

Aspect 36. The device of Aspect 35, wherein one or more of first microring or the second microring is larger than and within a threshold size of the other of the first microring and the second microring, and wherein the microresonator is larger than the one or more of the first microring or the second microring.

Aspect 37. The device of any one of Aspects 25-36, further comprising a partially reflecting component optically coupled between an output of the one or more microrings and the microresonator.

Aspect 38. The device of any one of Aspects 25-37, wherein the microresonator comprises a high-Q microresonator.

Aspect 39. The device of any one of Aspects 25-38, wherein the microresonator is configured to generate a narrowband back-reflection due to Rayleigh scattering.

Aspect 40. The device of any one of Aspects 25-39, wherein the microresonator is configured to function as an output mirror of a laser cavity.

Aspect 41. The device of any one of Aspects 25-40, wherein the optical amplifier is configured to receive a pump current.

Aspect 42. The device of any one of Aspects 25-41, wherein the frequency comb comprises a soliton-mod-elocked comb.

Aspect 43. The device of any one of Aspects 25-42, wherein the one or more optical filters and the microresonator are integrated into a complimentary metal oxide semiconductor (CMOS) platform.

Aspect 44. A device, comprising, consisting of, or consisting essential of: one or more optical filters, wherein the one or more optical filters are configured to be coupled to an optical amplifier; and a microresonator (e.g., or resonator, microring, ring-shaped waveguide) configured to receive an output of the one or more optical filters and output, based on parametric multiwave mixing, a frequency comb, wherein the one or more optical filters and the microresonator are integrated into a single chip.

Aspect 45. The device of Aspect 44, wherein the one or more optical filters comprise one or more of a grating or a ring-shaped waveguide.

Aspect 46. The device of any one of Aspects 44-45, further comprising a reflective portion disposed in one or more of the optical amplifier or a medium comprising the microresonator.

Aspect 47. The device of Aspect 46, wherein the reflective portion and the microresonator function as mirrors.

Aspect 48. The device of any one of Aspects 46-47, wherein the reflective portion comprises an end of the optical amplifier.

Aspect 49. The device of any one of Aspects 44-48, wherein the amplifier is a directly attached to the single chip without use of a coupling fiber.

Aspect 50. The device of any one of Aspects 44-49, wherein the microresonator has dimensions optimized for a dispersion characteristic.

Aspect 51. The device of any one of Aspects 44-50, further comprising one or more resistive microheaters configured to tune one or more of the microresonator or the one or more optical filters.

Aspect 52. The device any one of Aspects 44-51, wherein one or more of the microresonator and the one or more optical filters comprise silicon nitride.

Aspect 53. The device of any one of Aspects 44-52, wherein the optical amplifier comprises a waveguide comprising a III-V semiconductor material.

Aspect 54. The device of any one of Aspects 44-53, wherein the one or more optical filters and the microresonator are integrated into a complimentary metal oxide semiconductor (CMOS) platform.

Aspect 55. A device comprising, consisting of, or consisting essential of: a laser; and a microresonator (e.g., or resonator, microring, ring-shaped waveguide) configured to receive an output of the laser and generate a frequency comb, wherein a coupling between the micresonator and the laser is lithographically defined.

Aspect 56. The device of Aspect 55, wherein the laser comprises a planer integrated laser chip.

Aspect 57. The device of any one of Aspects 55-56, wherein the laser is coupled to the microresonator without an optical fiber.

Aspect 58. The device of any one of Aspects 55-57, wherein the microresonator comprises a planar integrated microresonator.

Aspect 59. The device of any one of Aspects 55-58, wherein the coupling comprises a waveguide.

Aspect 60. The device of Aspect 59, wherein the waveguide and the microresonator are fabricated on a complimentary metal oxide semiconductor platform.

Aspect 61. The device of any one of Aspects 55-60, wherein the microresonator has dimensions optimized for a dispersion characteristic.

Aspect 62. The device of any one of Aspects 55-61, further comprising one or more resistive microheaters configured to tune the microresonator.

Aspect 63. The device any one of Aspects 55-62, wherein the microresonator comprises silicon nitride.

Aspect 64. The device of any one of Aspects 55-39, wherein the laser comprises an optical amplifier, wherein the optical amplifier comprises a waveguide comprising a III-V semiconductor material.

Aspect 65. The device of any one of Aspects 55-64, wherein the one or more optical filters and the microresonator are integrated into a complimentary metal oxide semiconductor (CMOS) platform.

Aspect 66. The device of any one of Aspects 55-65, wherein the coupling between the micresonator and the laser comprises one or more of an edge coupling, a vertical coupling, a spot-size converter, or a chip-to-chip coupling.

Aspect 67. The device of any one of Aspects 55-66, wherein the laser and the microresonator are integrated monolithically on a substrate.

Aspect 68. The device of any one of Aspects 1-67, wherein the microresonator comprises one or more of silicon nitride, Hydex glass, silicon, aluminum nitride, or aluminum gallium arsenide.

Aspect 69. The device of any one of Aspects 1-67, wherein the one or more optical filters (e.g., tunable optical filters, microrings) comprises one or more of silicon nitride, Hydex glass, silicon, aluminum nitride, or aluminum gallium arsenide.

Definitions

It is to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise. The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading can occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

REFERENCES

1. Villares, G., Hugi, A., Blaser, S. & Faist, J. Dual-comb spectroscopy based on quantum-cascade-laser frequency combs. Nat. Commun. 5, 5192 (2014).
2. Suh, M.-G., Yang, Q.-F., Yang, K. Y., Yi, X. & Vahala, K. J. Microresonator soliton dual-comb spectroscopy. Science 354, 600-603 (2016).
3. Dutt, A. et al. On-chip dual comb source for spectroscopy. ArXiv161107673 Phys. (2016).
4. Li, J., Yi, X., Lee, H., Diddams, S. A. & Vahala, K. J. Electro-optical frequency division and stable microwave synthesis. Science 1252909 (2014). doi:10.1126/science.1252909
5. Papp, S. B. et al. Microresonator frequency comb optical clock. Optica 1, 10-14 (2014).
6. Suh, M.-G. & Vahala, K. Soliton Microcomb Range Measurement. ArXiv170506697 Phys. (2017).
7. Marin-Palomo, P. et al. Microresonator-based solitons for massively parallel coherent optical communications. Nature 546, 274-279 (2017).
8. Reimer, C. et al. Integrated frequency comb source of heralded single photons. Opt. Express 22, 6535-6546 (2014).
9. Savchenkov, A. A. et al. Low Threshold Optical Oscillations in a Whispering Gallery Mode CaF2 Resonator. Phys. Rev. Lett. 93, 243905 (2004).
10. Del'Haye, P. et al. Optical frequency comb generation from a monolithic microresonator. Nature 450, 1214-1217 (2007).
11. Matsko, A. B. et al. Mode-locked Kerr frequency combs. Opt. Lett. 36, 2845-2847 (2011).
12. Coen, S., Randle, H. G., Sylvestre, T. & Erkintalo, M. Modeling of octave-spanning Kerr frequency combs using a generalized mean-field Lugiato Lefever model. Opt. Lett. 38, 37-39 (2013).
13. Yi, X., Yang, Q.-F., Yang, K. Y., Suh, M.-G. & Vahala, K. Soliton frequency comb at microwave rates in a high-Q silica microresonator. Optica 2, 1078-1085 (2015).
14. Brasch, V. et al. Photonic chip-based optical frequency comb using soliton Cherenkov radiation. Science 351, 357-360 (2016).

15. Liang, W. et al. Whispering-gallery-mode-resonator-based ultranarrow linewidth external-cavity semiconductor laser. Opt. Lett. 35, 2822-2824 (2010).
16. Jung, H., Xiong, C., Fong, K. Y., Zhang, X. & Tang, H. X. Optical frequency comb generation from aluminum nitride microring resonator. Opt. Lett. 38, 2810-2813 (2013).
17. Peccianti, M. et al. Demonstration of a stable ultrafast laser based on a nonlinear microcavity. Nat. Commun. 3, 765 (2012).
18. Okawachi, Y. et al. Octave-spanning frequency comb generation in a silicon nitride chip. Opt. Lett. 36, 3398-3400 (2011).
19. Ferdous, F. et al. Spectral line-by-line pulse shaping of on-chip microresonator frequency combs. Nat. Photonics 5, 770-776 (2011).
20. Wang, L. et al. Frequency comb generation in the green using silicon nitride microresonators. Laser Photonics Rev. 10, 631-638 (2016).
21. Ji, X. et al. Ultra-low-loss on-chip resonators with sub-milliwatt parametric oscillation threshold. Optica 4, 619-624 (2017).
22. Griffith, A. G. et al. Silicon-chip mid-infrared frequency comb generation. Nat. Commun. 6, 6299 (2015).
23. Kuyken, B. et al. An octave-spanning mid-infrared frequency comb generated in a silicon nanophotonic wire waveguide. Nat. Commun. 6, (2015).
24. Hausmann, B. J. M., Bulu, I., Venkataraman, V., Deotare, P. & Lončar, M. Diamond nonlinear photonics. Nat. Photonics 8, 369-374 (2014).
25. Fang, A. W. et al. Electrically pumped hybrid AlGaInAs-silicon evanescent laser. Opt. Express 14, 9203-9210 (2006).
26. Campenhout, J. V. et al. Electrically pumped InP-based microdisk lasers integrated with a nanophotonic silicon-on-insulator waveguide circuit. Opt. Express 15, 6744-6749 (2007).
27. Kobayashi, N. et al. Silicon Photonic Hybrid Ring-Filter External Cavity Wavelength Tunable Lasers. J. Light. Technol. 33, 1241-1246 (2015).
28. Lee, J.-H. et al. Demonstration of 122% wall plug efficiency in uncooled single mode external-cavity tunable Si/III-V hybrid laser. Opt. Express 23, 12079 (2015).
29. Stern, B., Ji, X., Dutt, A. & Lipson, M. Compact narrow-linewidth integrated laser based on a low-loss silicon nitride ring resonator. Opt. Lett. 42, 4541-4544 (2017).
30. Fan, Y. et al. 290 Hz Intrinsic Linewidth from an Integrated Optical Chip-based Widely Tunable InP-Si3N4 Hybrid Laser. in Conference on Lasers and Electro-Optics (2017), paper JTh5C.9 JTh5C.9 (Optical Society of America, 2017). doi:10.1364/CLEO_AT.2017.JTh5C.9
31. Johnson, A. R. et al. Microresonator-based comb generation without an external laser source. Opt. Express 22, 1394-1401 (2014).

What is claimed:

1. A device, comprising:
   a first portion comprising an optical amplifier and a transmissive end; and
   a second portion adjacent the transmissive end of the first portion and configured to receive an output from the optical amplifier, wherein the second portion comprises:
      one or more tunable optical filters; and
      a microresonator configured to:
         receive an output of the one or more tunable optical filters,
         reflect light back to the one or more tunable optical filters, and
         output, based on parametric multiwave mixing, a frequency comb,
   wherein the frequency comb comprises a soliton-mode-locked comb generated simultaneously with injection locking.

2. The device of claim 1, wherein the one or more tunable optical filters are configured, based on an alignment relative to each other, to perform wavelength selection.

3. The device of claim 1, wherein the first portion comprises a mirror configured to reflect light back to the transmissive end.

4. The device of claim 1, wherein the one or more tunable optical filters and the microresonator are integrated into a single chip.

5. The device of claim 1, wherein the one or more tunable optical filters comprises a first microring serially coupled to a second microring, and wherein the one or more tunable optical filters are serially coupled to the microresonator.

6. The device of claim 1, wherein the microresonator comprises a high-Q microresonator.

7. The device of claim 1, wherein the microresonator being configured to reflect light comprises the microresonator being configured to generate a narrowband back-reflection due to Rayleigh scattering.

8. The device of claim 1, wherein the microresonator is configured to function as an output mirror of a laser cavity.

* * * * *